March 1, 1955 W. G. STOECKICHT 2,703,021
HELICAL GEAR SET

Filed May 1, 1950 3 Sheets-Sheet 1

Wilhelm Gustav Stoeckicht INVENTOR

BY Bailey Stephens & Huettig
ATTORNEY

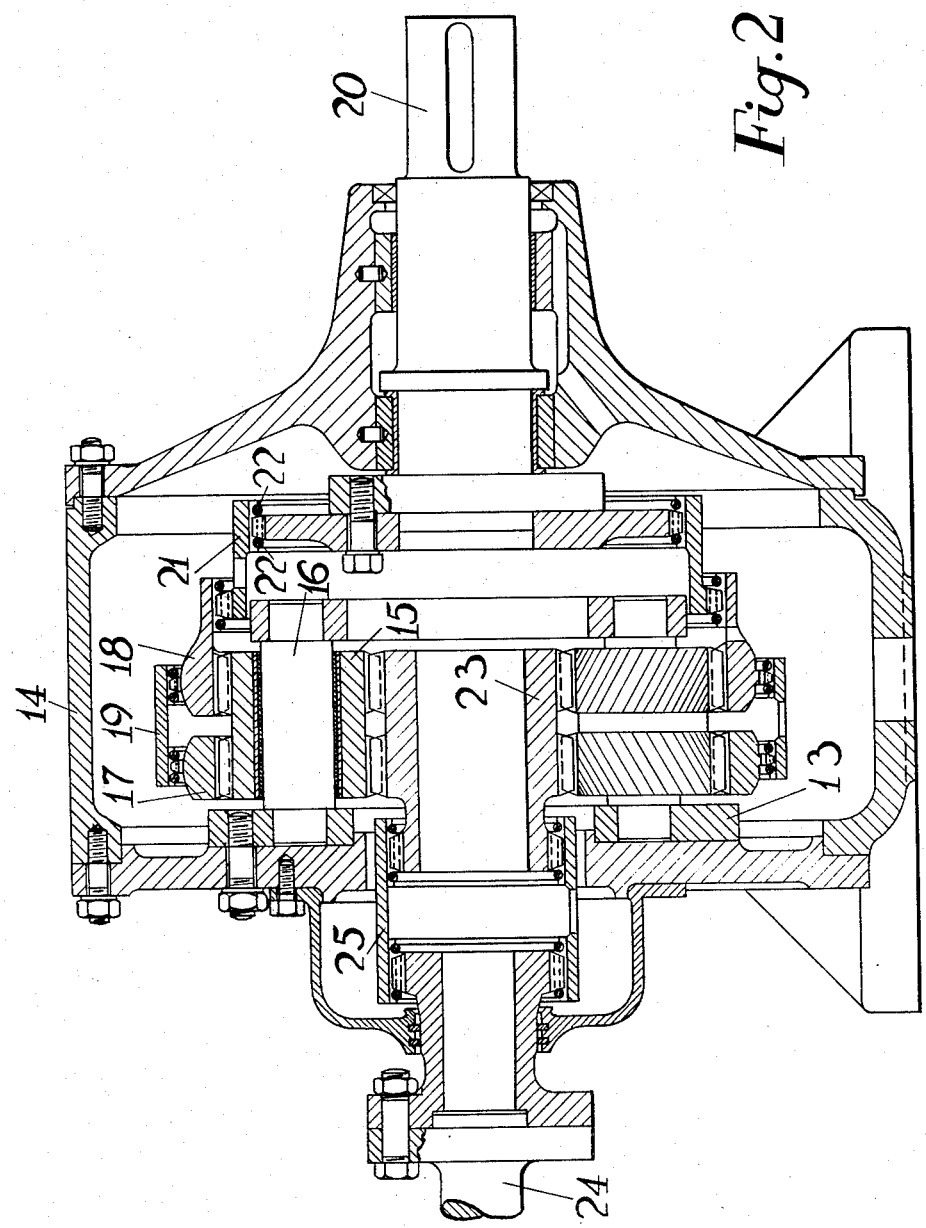

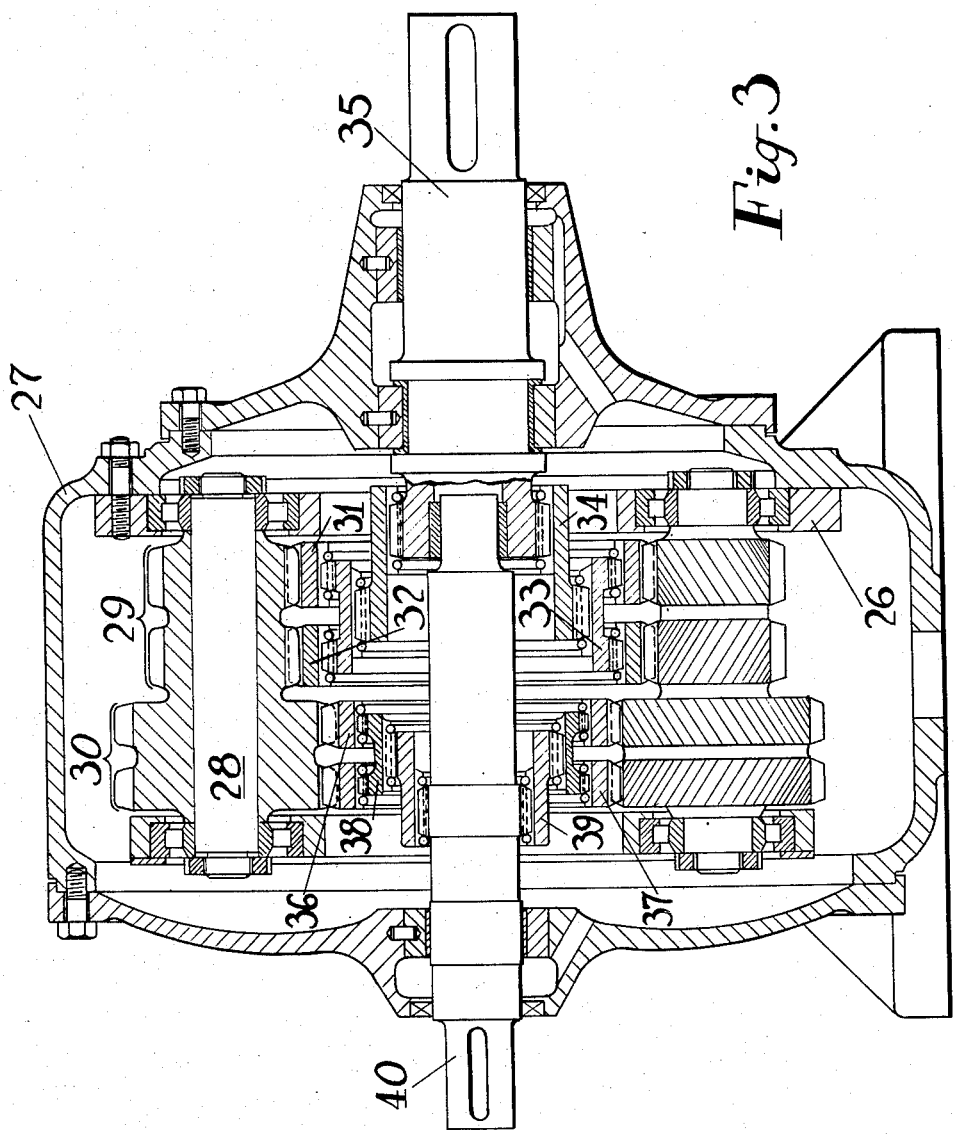

United States Patent Office 2,703,021
Patented Mar. 1, 1955

2,703,021

HELICAL GEAR SET

Wilhelm G. Stoeckicht, Munich-Solln, Germany

Application May 1, 1950, Serial No. 159,358

Claims priority, application Germany April 30, 1949

7 Claims. (Cl. 74—410)

This invention relates to helical gear sets and in particular to helical gear sets, including helical planetary gear sets, employing helical gears with double helical teeth in herringbone arrangement.

The employment of such double helical gears, while possessing known advantages, including compensation for the tendency for axial shifting, have however the disadvantage that the self-adjustment of the individual rings of double helical teeth to equality of load-sharing between the individual toothed half-wheels is practically unattainable. In toothed gearing with double helical teeth there is always one wheel that is axially guided, the other wheel or wheels adjusting themselves axially to the teeth of this one wheel. If one wheel in a nepicyclic gear is axially held stationary, all the other wheels must adjust themselves to this guiding wheel. This is only possible in practice with quite small peripherial speeds, because even at medium speeds the inertia forces opposing the self-adjusttment and arising from the unavoidable errors of pitch or action in the teeth become too large. This involves the result that periodically there is always only one of the two halves of the double helically toothed wheels that has to take up the entire tooth pressure. The advantage of double helical toothed gearing is however thereby nullified, and the gear might just as well have been constructed as a simple toothed gear with a tooth breadth half that of the double helical gear.

According to the present invention these objections are obviated by sub-dividing at least one of the meshing helical gear wheels in such manner that two helically toothed wheels with oppositely directed helical gear teeth are provided and that these two helical gear wheels are connected with one another, and with the member which takes up the torque, in such manner as to permit the two gear wheels individually and automatically, in rotation of the meshing gear wheels, to adjust themselves to the applied tooth pressures and thereby effect equal distribution of the torque load regardless of such tooth irregularities as may exist. The connection involved is such as permits small angular or pivotal movements of the thus connected gear wheels to take place to compensate for tooth irregularities and to equally distribute the applied torque load. In this way, a gear set with intermeshing double helical gear teeth is provided, involving a double helical gear divided into two separate single helical gears, which are capable of adjusting themselves individually and automatically to pressures exerted thereon at the point of engagement of their teeth, in rotation of the meshing gears. If one of the helical gear wheels of the gear set is mounted to function as a locating wheel, the gears meshing therewith are able to adjust themselves to compensate for such tooth irregularities as may exist and give rise to unequal load effects and thereby permit the gear set to function as if the gear teeth were free from dimensional or manufacturing errors.

Notwithstanding this sub-division of one or more of the double helical gear members the gear set functions as a gear with meshing double helical or herringbone gears and involves no limitations as regards the permitted tooth angles, which may be made as large as is required, or is practicable.

The invention, accordingly, has for its object to provide a helical gear set which involves inherent compensation for tooth irregularities and enables the meshing helical gears to adjust themselves, in rotation, so as equally to distribute the applied torque load throughout the meshing gear teeth.

The invention also has for its object to provide helical gear sets of compact and efficient assembly and construction, which involve simple yet efficient mountings for the gear components and enables the gear sets, as a whole, to be automatically adjustable, in rotation, so as to obtain equal distribution of the applied torque load, with attendant compensation for such tooth irregularities as may exist.

According to one form of the invention a helical gear set comprises two single helical gear wheels connected with each other by a double-toothed coupling and in mesh with a double or herringbone helical gear, with this toothed coupling, in turn, connected to a part of the gear set which takes up the torque. The two double toothed couplings are therefore connected in series with one another. It is however also possible instead, with the same action, to connect each of the two toothed halves of the central wheel, by way of a double toothed coupling, with the member taking up its torque. In this way the two toothed couplings are connected in parallel.

Frequently it is advisable so to select the moment of inertia and the moment of resistance of each of the two toothed halves of the central wheel that their resilient flexibility can come into action independently of one another to assist the equalisation of tooth pressure in the two halves.

Preferably the teeth of each toothed coupling that meshes directly with one toothed half of the central wheel are made with such obliquity that the axial forces occurring in the teeth of the double toothed coupling are taken up. In this way, the angular mobility and the radial mobility of the toothed halves of the central wheel are safe-guarded in a particularly simple manner.

If only one central wheel according to the invention, is divided, then according to a further feature of the invention the other central wheel, which is undivided, is unsupported by a bearing, and is connected with the member that takes up its torque by means of a double toothed coupling. On the assumption, which is always fulfilled in practice, that this central wheel co-operates with three or more planet wheels, two bearings for this central wheel are in this way saved, in that the tooth engagements give the central wheel an accurate location. This measure leads on the one hand to a cheapening of the gear and to an elimination of sources of trouble, and on the other hand to a reduction of losses of power, which is particularly advantageous in the case of high-speed gears.

Three embodiments of the invention are illustrated by way of example in a simplified construction in the accompanying drawings, in which:

Figure 2 is a similar view of a gear with a stationary planet carrier; and

Figure 3 shows in longitudinal section another form of construction of the gear.

Figure 1:
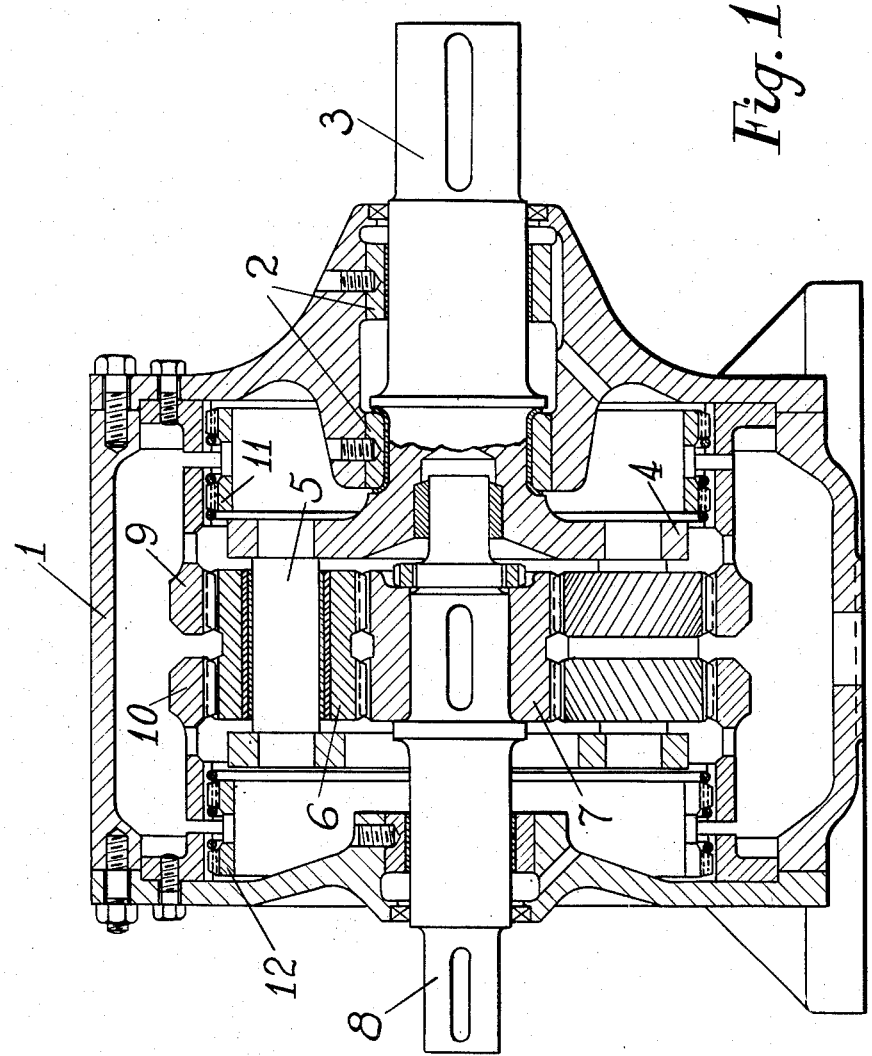
Figure 1 shows in longitudinal section a gear constructed according to the invention with a revolving planet-carrier.

In a casing 1, by means of bearings 2, a shaft 3 is supported, which carries the planet-carrier 4 of a sun-and-planet gear. In this planet-carrier 4, on studs 5, are mounted planet pinions 6, of which, for the sake of greater clearness, two are shown in the drawing, one being in axial section and the other in outside elevation. The planet pinions 6 are provided with double helical teeth. They mesh on the one hand with a sun wheel 7, which is mounted fast upon a shaft 8, which is journalled on the one hand in the casing 1 and on the other hand in the shaft 3. The planet pinions 6, with one half of their double helical teeth, mesh with an outer central wheel or annulus 9, and with the other half of their double helical teeth they mesh with a second central wheel or annulus 10. The two central wheels 9 and 10 are accordingly provided with simple helical teeth, the inclination of which is different. The central wheels 9 and 10 are non-rotatably connected with the casing 1, by means of double toothed couplings 11 and 12 respectively, these toothed couplings giving the central wheels 9 and 10 separately those degrees of freedom for self-adjustment which permit them to adjust themselves, for the purpose of compensating for errors in pitch, to equal distribution of load of the tooth-engagement forces. It is here advantageous, in a manner known in itself, to construct the teeth of the toothed couplings 11 and 12 as helical teeth, the angle of obliquity being so selected that the axial thrusts arising from the tooth pressures of the central wheels 9 and 10 are transmitted by way of the helical teeth of the toothed couplings 11 and 12. The outer central wheels 9 and 10 are furthermore so constructed, in a manner known in itself, that under the action of the radial tooth forces, each of them can yield resiliently, to a small extent, independently of the other, in such a way that by this means again an equalisation of tooth loading occurs.

The method of operation of the invention may be described as follows: When the epicyclic gear is transmitting power, the planet pinions 6 will adjust themselves axially to the two outer central wheels 9 and 10 which may be regarded as a locating wheel, with double helical teeth, in such a way that the two helically toothed halves thereof are equally loaded. In the same way the sun wheel 7 will axially adjust itself to the double helical toothing of the planet pinions 6. Now in operation, as a result of unavoidable toothing errors, differences of loading arise between the two toothing halves, which, as explained above, no longer admit of being equalised by axial displacements of the individual wheels particularly as the errors in each wheel, and therefore the differences of loading, prove to be different. Now this is where the action of the present invention comes in, according to which, in each helically toothed half-system, owing to the self-adjustment, and, it may be, resilient flexibility of the outer central wheels 9 and 10, an equalisation of the tooth pressures occurs, and therefore an even distribution of load amongst the planet pinions. It has been found that this equalising action works out in such a way that the inevitable toothing errors compensate for one another, and are as it were levelled out. They therefore now no longer give rise to supplementary stresses, and the entire system works as if the teeth were perfectly free from errors. Hence there is no longer any disturbance of the even distribution of load between the two double helically toothed halves of the gear system. The action accordingly permits not only the faultless employment of double helically toothed wheels in epicyclic gears, but over and above this attains the effect that the equal distribution of load between the two halves of double helically toothed wheels can no longer be impaired by dynamic supplementary forces, a result which had hitherto proved unattainable.

In the example shown in Figure 1 only the two outer central wheels 9 and 10 are shown divided. The action of the invention is not fundamentally altered if the division is effected on the inner sun wheel 7, or both internally and externally.

In Figure 2 the application of the invention to the case of a gear with a stationary planet-carrier is illustrated. In this constructional example the planet-carrier 13 is connected fast with the gear casing 14. The planet pinions 15 are mounted in a known manner upon studs 16 in the planet-carrier 13. The two toothed rings 17 and 18 constituting halves of the outer central wheel or drum are not supported by bearings, and are kinematically connected with one another by means of a double toothed coupling 19. Here the teeth of the double toothed coupling 19 are given such an obliquity and such a direction of obliquity that the axial thrusts occurring at the toothed rings 17 and 18 are transmitted by way of the teeth of the double toothed coupling 19, and are equalised within the toothed coupling. The outer central-wheel unit is connected with the slowly revolving shaft 20, which in the case of a reducing gear is the driven shaft, by way of a double toothed coupling 21, which by means of lateral contact rings 22 gives the axial location to the outer central-wheel unit. The inner central wheel 23 is not supported in bearings, but is kinematically connected with the driving shaft 24 by way of a double toothed coupling 25. The driving shaft 24 may here be the shaft of the driving engine.

As in the constructional example of Figure 1, here again the two toothed rings 17 and 18 of the outer central wheel can adjust themselves independently of one another to equilibrium of forces and compensation for errors of pitch, and thereby ensure the same effect as has been described for the constructional example of Figure 1. In order to attain this result according to the invention it is immaterial whether the gear is constructed with the planet-carrier revolving or stationary.

The form of construction illustrated in Figure 2, in which the undivided central wheel or sun wheel 23 is not supported by bearings but is pivotally connected with the member 24 that takes up its torque, has the great constructional advantage that the tooth engagements (it is here a question in each instance of three or more tooth engagements) each can take the place in one toothed half wheel of one bearing, and thus give the central wheel accurate location. In this way two bearings for this central wheel are saved. This not only makes the gear cheaper to manufacture and eliminates sources of error, but also, particularly in the case of high-speed drives, obviates losses of power. This form of construction is illustrated in Figure 2 as applied by way of example to a gear with a stationary planet-carrier, but may of course also be employed in the same way for gears with a revolving planet-carrier.

Figure 3 illustrates the application of the invention to the case of a gear with a stationary planet-carrier and two sun wheels. Here the planet-carrier 26 is fixed to the gear casing 27. In it are journalled a number of intermediate wheel shafts 28, usually three, each of which carries two double helically toothed intermediate wheels 29 and 30. In the drawing, which represents a longitudinal section through the gear, for the sake of greater clearness, to intermediate wheel shafts 28 are shown, one with the intermediate wheels in section and the other with the intermediate wheels in outside elevation. The double helically toothed intermediate wheels 29 mesh with one sun wheel, the halves 31 and 32 of which are sometimes in mesh with the double helically toothed halves of the intermediate wheels 29. The wheel halves 31 and 32 are connected with one another by a double toothed coupling 33, which, in a manner known in itself, is constructed with helical teeth, so that by these, besides the peripheral force, the oppositely directed axial thrusts arising from the obliquity of the double helical teeth are transmitted. The sleeve of the toothed coupling 33 is in its turn likewise connected by a double toothed coupling 34 with the gear shaft 35. In the same manner the intermediate wheels 30 are in mesh with the halves 36 and 37 of a second sun wheel. The two halves 36 and 37 are connected with one another by means of a double toothed coupling 38 with helical teeth. The sleeve of the toothed coupling 38 is connected by means of a double toothed coupling 39 with the second gear shaft 40. Here again the method of operation is that the two half sun wheels 31 and 32 or 36 and 37 can adjust themselves independently to a state of equilibrium of forces, thus evening out or compensating for any unavoidable errors, in the action of the teeth, and thereby precluding vibrations such as would dynamically excite additional forces, which otherwise would tend to upset the equal distribution of load amongst the double helically toothed half-wheels. It is here immaterial whether the two halves of the sun wheel are connected by means of a double toothed coupling, which in its turn is kinematically connected with one shaft, as illustrated for the wheel halves 31 and 32 or 36 and 37, or whether each half of the sun wheel is connected with the gear shaft with one toothed coupling each.

In the constructional example illustrated in Figure 3, the sun wheel 31, 32 is represented as an axially located wheel, while the sun wheel 36, 37 is axially located according to the wheels 30 that are in mesh therewith.

Having now particularly described and ascertained the nature of my said invention and in what manner the same is to be performed, I declare that what I claim is:

1. In a helical gear set, casing structure, a first transmission member mounted on one side of said casing structure and a second transmission member mounted on the opposite side thereof, said second transmission member carrying a toothed coupling ring and said first transmission member also including a toothed coupling ring, and a helical gear train in said casing structure and connecting said transmission members, said gear train comprising an inner sun gear, an outer ring gear, and pinions engaged between said sun gear and ring gear, means mounting said pinions on said casing structure, and means coupling said sun gear to the said toothed coupling ring of said first transmission member, said sun gear and pinions having intermeshed double helical teeth of herringbone arrangement and said outer ring gear being constituted by two separate helical gear rings having single but opposite direction helical teeth, one said helical gear ring being in mesh with the gear teeth of the said pinions of one direction and the other helical gear ring being in mesh with the helical gear teeth of said pinions of the opposite direction, said helical gear rings having coupling teeth, a coupling element engaged with said coupling teeth and inter-connecting said helical gear rings, and a coupling connection between one said helical gear ring and the said toothed coupling ring carried by said second transmission member, said toothed coupling connections permitting adjustment of the meshing gears to take place automatically in the rotation of the gears, whereby to equalize the torque load on the meshing gear teeth.

2. In a helical gear set, a stationary member, a pair of co-axial shaft members rotatably mounted upon said stationary member, pinion carrier structure connected with said stationary member, a gear pinion rotatably mounted on said carrier structure, said gear pinion having integral helical gear teeth of herringbone arrangement, a central helical gear member connected with one of said shaft members and having helical gear teeth in mesh with the gear teeth on said gear pinion, a pair of separate ring gears having oppositely inclined internal helical gear teeth in mesh with the correspondingly inclined gear teeth on said gear pinion, coupling means interconnecting said separate ring gears for adjustment relatively to one another to compensate for tooth irregularities, and similar coupling means connecting said separate ring gears with the other shaft member.

3. A helical gear set as claimed in claim 2, said central helical gear being separate from said one shaft member, and coupling means connecting said central gear with said shaft, said coupling means including inter-engaging parts for transmitting rotary movement of said shaft to said central gear and said inter-engaging parts providing for self axial and angular adjustment of said central gear relatively to the said shaft and gear pinion to compensate for tooth irregularities and equalise the torque load during rotation of the intermeshing gears.

4. In a helical gear set, a stationary member, a pair of coaxial shaft members mounted for rotation relative to said stationary member, gearing interconnecting said shaft members, said gearing comprising intermeshing gear elements which include a plurality of integral helical gear elements having inclined gear teeth in double helical arrangement, the gear tooth inclination adjacent one side of each said integral helical gear element being opposite the gear tooth inclination adjacent the other side thereof, said integral helical gear elements having axes parallel to the common axis of said shaft members and being spaced equidistantly from and equidistantly about said common axis, a plurality of separate single helical independently adjustable gear rings having inclined gear teeth in single helical arrangement, the gear tooth inclination of each said ring being opposite the gear tooth inclination of an adjacent ring, said rings being coaxial with said shaft members and said inclined gear teeth on said rings being in mesh with the correspondingly inclined gear teeth on said integral helical gear elements, first flexible coupling means connecting one of said rings to one of said members for adjustment of said one ring relative to another of said rings, and second flexible coupling means connecting said other of said rings to one of said members for adjustment of said other ring relative to said one ring.

5. In a helical gear set, a stationary member, a pair of coaxial shaft members mounted for rotation relative to said stationary member, gearing interconnecting said shaft members, said gearing comprising intermeshing gear elements which include a plurality of integral helical gear elements having inclined gear teeth in double helical arrangement, the gear tooth inclination adjacent one side of each said integral helical gear element being opposite the gear tooth inclination adjacent the other side thereof, said integral gear elements having axes parallel to the common axis of said shaft members and being spaced equidistantly from and equidistantly about said common axis, a plurality of separate single helical independently adjustable gear rings having inclined gear teeth in single helical arrangement, the gear tooth inclination of each said ring being opposite the gear tooth inclination of an adjacent ring, said rings being coaxial with said shaft members and said inclined gear teeth on said rings being in mesh with the correspondingly inclined gear teeth on said integral helical gear elements, first yieldable coupling means connecting one of said rings to one of said members for adjustment of said one ring relative to another of said rings, and second yieldable coupling means connecting said other of said rings to one of said members for adjustment of said other ring relative to said one ring.

6. A helical gear set as claimed in claim 2, said coupling means including two axially spaced toothed rings meshing with the teeth of said separate ring gears, one of said ring gears having a further toothed ring, a toothed ring connected with one of said shaft members and further coupling means having two axially spaced toothed rings, one of said last mentioned toothed rings meshing with said further toothed ring and the other of said last mentioned toothed rings meshing with the said toothed ring connected with said one shaft.

7. A helical gear set as claimed in claim 5, one said shaft members carrying gear carrier means, and said integral helical gear elements being carried by said gear carrier means.

References Cited in the file of this patent

UNITED STATES PATENTS

| | | |
|---|---|---|
| 1,820,061 | Flagg | Aug. 25, 1931 |
| 2,369,422 | Williams | Feb. 13, 1945 |
| 2,380,113 | Kuhns | July 10, 1945 |
| 2,386,367 | Taylor | Oct. 9, 1945 |
| 2,427,505 | Newcomb | Sept. 16, 1947 |
| 2,460,629 | Fawick | Feb. 1, 1949 |
| 2,496,857 | Cronstedt et al. | Feb. 7, 1950 |
| 2,516,077 | Schmitter | July 18, 1950 |
| 2,555,586 | Falk | June 5, 1951 |
| 2,591,734 | Smith et al. | Apr. 8, 1952 |
| 2,591,743 | Thompson | Apr. 8, 1952 |

FOREIGN PATENTS

| | | |
|---|---|---|
| 719,349 | France | Nov. 14, 1931 |
| 721,714 | Germany | June 15, 1942 |